Figure 1:
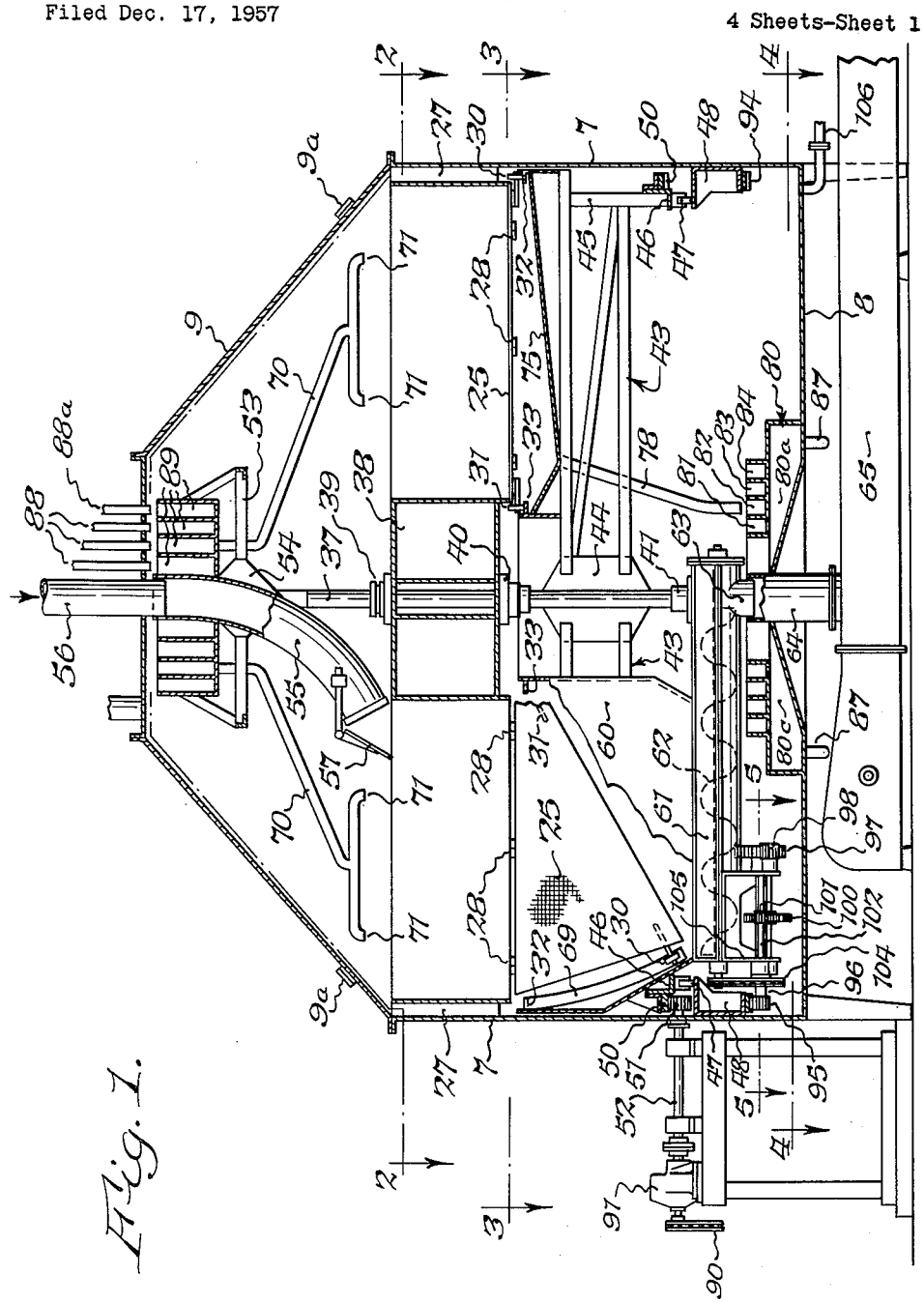

Feb. 13, 1962 C. B. UPTON 3,021,201
SOLVENT EXTRACTION APPARATUS
Filed Dec. 17, 1957 4 Sheets-Sheet 1

INVENTOR.
Charles B. Upton
BY
Parker & Trochnov,
Attorneys.

Feb. 13, 1962  C. B. UPTON  3,021,201
SOLVENT EXTRACTION APPARATUS
Filed Dec. 17, 1957  4 Sheets-Sheet 2

INVENTOR.
Charles B. Upton,
BY
Parker Prchnor,
Attorneys.

Feb. 13, 1962 C. B. UPTON 3,021,201
SOLVENT EXTRACTION APPARATUS
Filed Dec. 17, 1957 4 Sheets-Sheet 4

INVENTOR.
Charles B. Upton,
BY
Parker & Brochman,
Attorneys.

United States Patent Office 3,021,201
Patented Feb. 13, 1962

3,021,201
SOLVENT EXTRACTION APPARATUS
Charles B. Upton, Piqua, Ohio, assignor to The French Oil Mill Machinery Company, Piqua, Ohio
Filed Dec. 17, 1957, Ser. No. 703,368
15 Claims. (Cl. 23—272.5)

This invention relates to a continuous solvent extraction apparatus and process for the leaching of oils and other soluble materials from solids. This apparatus and process can be applied to the leaching of any soluble material from a solid, using a liquid solvent, but has been particularly developed for the extraction of oil and fats from vegetable and animal materials.

The type of solvent extractors are generally divided into two classes. The first involves percolation of the liquid thru the solid and the second class involves immersion of the solid in the liquid. My invention relates to a percolation type of extractor and extraction system. Many variations in the percolation type of extractor have been used. The most common is a continuous basket extractor in which baskets or compartments are filled with solid material and move thru a continuous system. When these extractors are built in larger sizes the design of structural support for the extractors and of bearings becomes more and more expensive. Furthermore in extractors in which the containers for the solid material move, the material in the containers is subject to a certain amount of vibration or agitation which releases some solid material in the form of fines from the bulk of the material and which then passes into the miscella.

One of the objects of this invention is to provide an extractor of this type in which the flakes or solids to be extracted are charged into stationary baskets or cells in which they remain completely at rest throughout the extraction cycle until they are discharged, so that the fine particles of the solids or flakes remain in the baskets or cells and form a filter bed for the solvent and miscella passing through the same, thus producing a miscella containing fewer fines. A further object is to provide an extractor of this type in which the various devices for use in connection with the extraction are mounted on a carriage on which they are movable relatively to the stationary baskets or cells so that the material under treatment may remain completely at rest whereas the relatively light devices for treating the solids may be moved relatively to the baskets or cells. A further object is to provide a treating apparatus of this kind which includes mechanism for charging the stationary baskets or cells with the material to be treated and discharging the treated material from the baskets or cells without changing the positions of the baskets relatively to the apparatus.

It is also an object to provide apparatus of this type in which the movable carriage or frame carries sprays for subjecting the solid material to solvents of successive strengths and to receive from the baskets or cells miscella which has passed through the solid material.

Another object is to provide apparatus of this type in which the movable frame or carriage when receiving the extracted solids immediately discharges the same from the apparatus so that only a part of the weight of these solids is momentarily supported by the movable frame or carriage.

Another object is to provide on the movable frame a chute or feed passage for the solids or flakes to be treated and which discharges this material successively to the various cells or baskets, the chute or feed passage having a part which moves with the movable frame into the various positions for filling the baskets or cells.

Other objects and advantages will be apparent from the following description of some embodiments of the invention, and the novel features will be particularly pointed out hereinafter in connection with the appended claims.

In the accompanyng drawings which illustrate by way of example one embodiment of this invention:

FIG. 1 is a central, sectional elevation of a solvent extraction apparatus embodying this invention.

Figure 2:
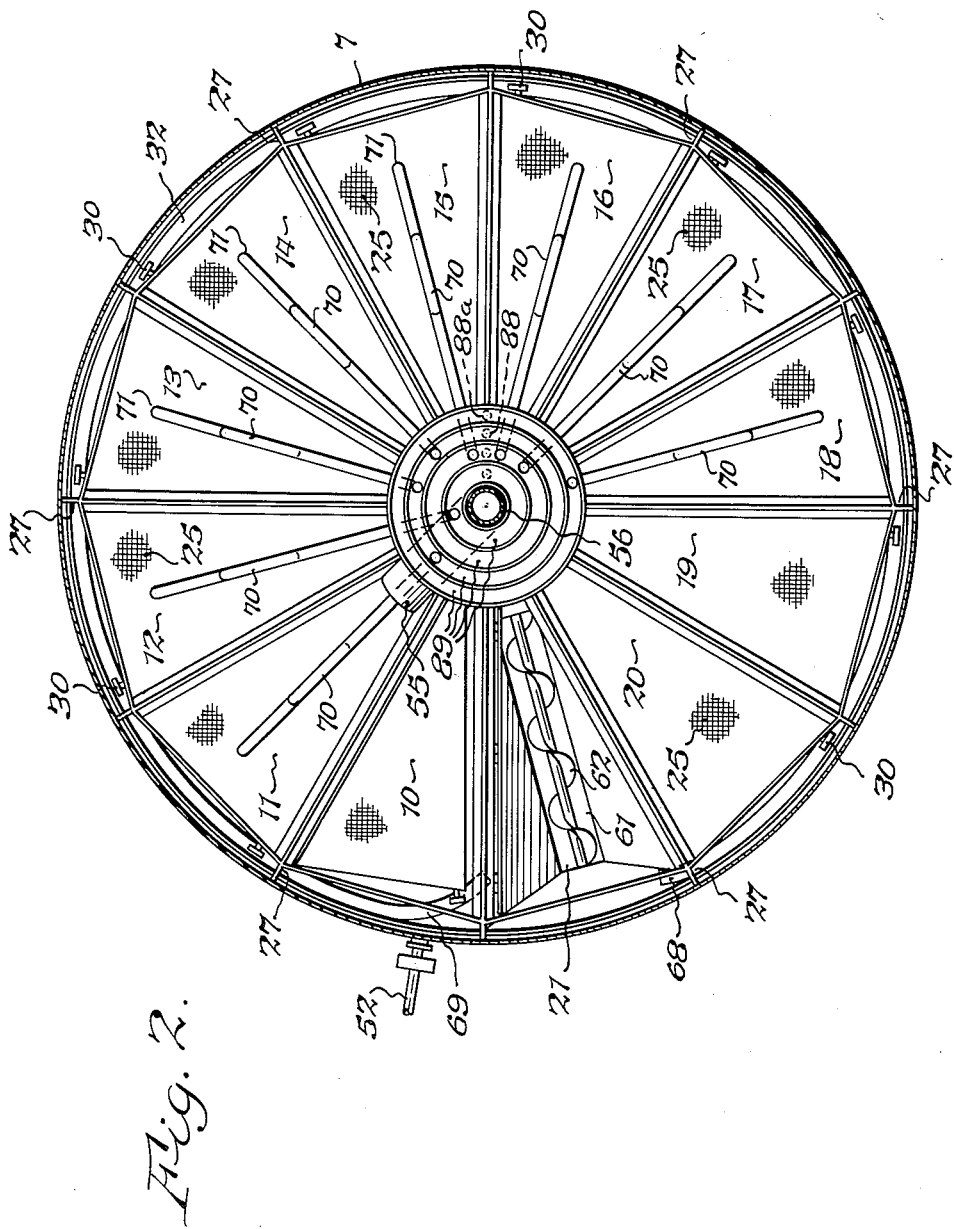
Figure 3:
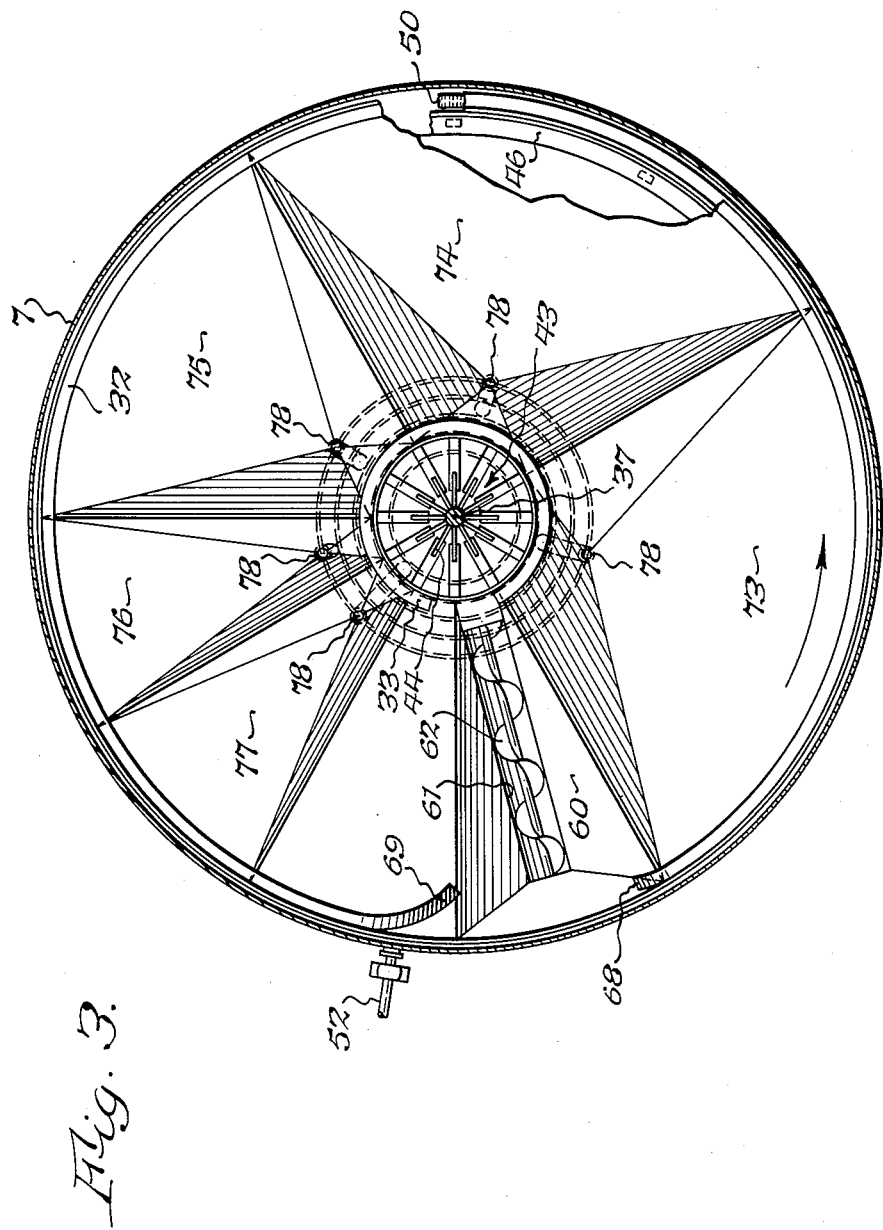
Figure 4:
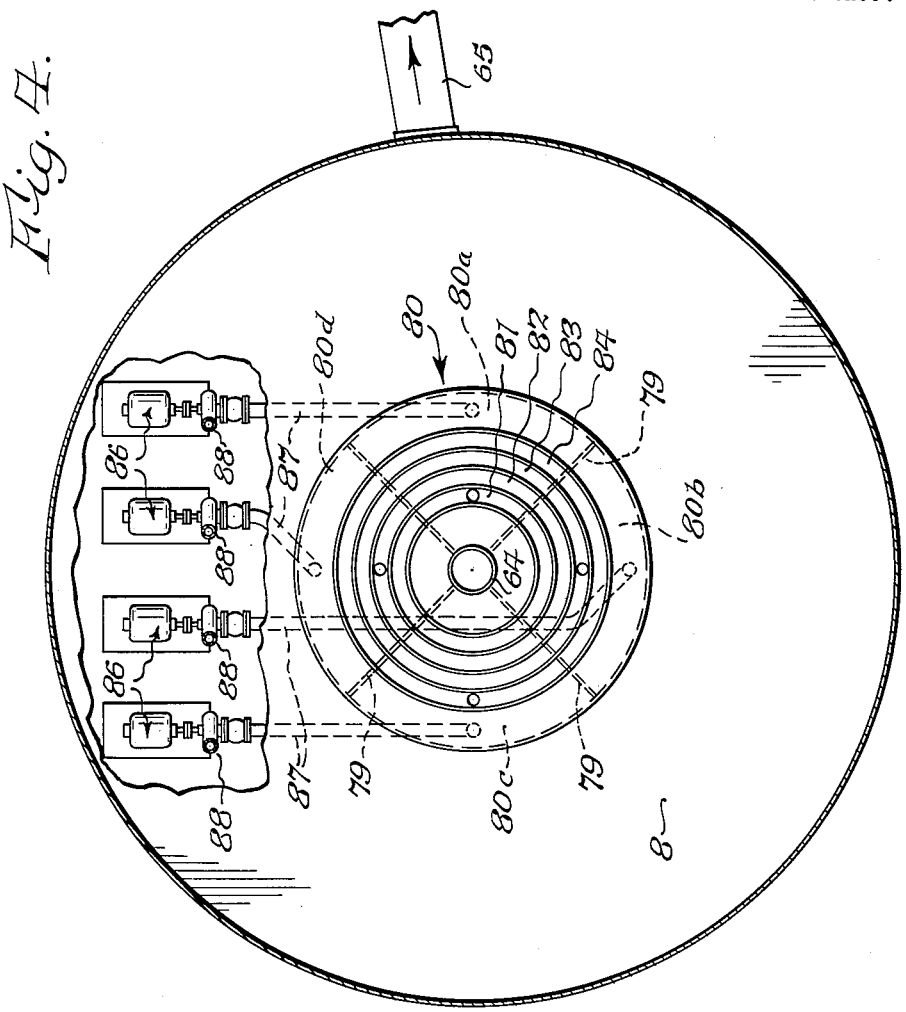

FIGS. 2, 3 and 4 are horizonal, sectional views thereof respectively on lines 2—2, 3—3 and 4—4, FIG. 1.

Figure 5:
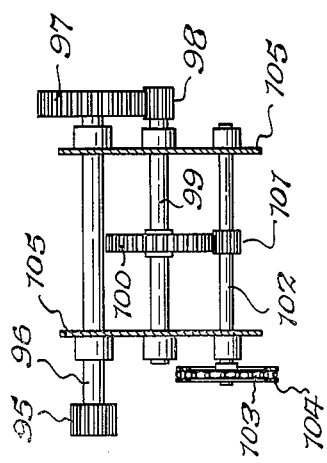

FIG. 5 is a fragmentary, sectional view thereof on line 5—5, FIG. 1.

General construction

The apparatus embodying this invention includes an outer wall 7 which in the construction illustrated is approximately cylindrical and is connected with a bottom 8. The upper end of the side wall 7 is closed by means of a dome or cover 9 which may be provided with sight glasses 9a through which the operation of the apparatus may be observed, and with a manhole and cover (not shown).

Within the housing is arranged a series of stationary baskets or cells 10–21 which are the containers for the material to be treated. These baskets or cells are arranged in an endless path, for example in a circle, in the particular construction illustrated, and they are of sector shape and each has a perforate bottom 25. These baskets or cells are rigidly mounted on the stationary housing of the apparatus, for example by means of radially extending plates or bars 27 which have their outer ends welded or otherwise secured to the side wall 7 of the apparatus. The baskets have radially extending side walls and end walls and the bottoms 25 of sector shape are each hinged at one side thereof to a side wall of a basket, as indicated at 28. The edge of each bottom opposite to that which is hinged is provided with rollers 30 and 31 arranged to roll on suitable guide tracks or cams 32 and 33.

The means for filling and emptying the containers and for treatment of the material in the baskets are mounted on a rotatable frame or carriage within the housing of the apparatus. Since the apparatus shown in the drawings has the containers arranged in a circular path, the frame or carriage also moves in a similar path concentric with the path about which the containers are arranged, but it will be understood that it is not intended to limit this invention to apparatus in which the containers are arranged in a circular path. In the particular construction shown for this purpose this frame is mounted on an upright rotary column or shaft 37 which is suitably journalled in the apparatus in any desired manner. In the construction illustrated the stationary mounting for the containers includes a drum shaped central portion 38 to which the inner ends of the stationary containers are connected. The shaft 37 is journalled on this central portion 38 and for that purpose is provided with suitable bearings 39 and 40 secured respectively to the upper and lower surfaces of the stationary frame portion 38. The lower end of this shaft may also have a flanged sleeve 41 secured thereto and which is secured to a conveyor housing to be hereinafter described and which also rotates with the frame or carriage of the apparatus.

The movable frame or carriage has a plurality of radially extending arms in the form of structural members or beams 43 which may be rigidly of any desired construction. The inner ends of these beams are secured to plates 44 welded or otherwise mounted on the shaft or column 37 and the outer ends of these arms have upright legs 45 rigidly secured thereto. Preferably the lower ends of these legs are secured to an annular frame member 46 which may be of angle shaped cross section. Wheels or rollers 47 pivoted on brackets secured to the frame member 46 at intervals are positioned to roll on an annular flange or structural member 48 secured to the side wall 7.

Rotary motion may be imparted to the frame or carriage by any suitable mechanism. For example in the construction shown the annular frame member 46 has an annular rack 50 suitably mounted thereon. This rack meshes with a pinion 51 mounted on the end of a shaft 52 which may be driven in any suitable manner and which extends through the wall 7 of the apparatus.

The rotary frame or carriage also includes a part mounted on the shaft 37 above the bearings 39 and 40. This upper part of the carriage includes supporting brackets 53 secured to a plate 54 which in turn is secured to the shaft 37.

The supply of material to be treated in the various baskets or containers is effected by means of a discharge nozzle 55 which is suitably secured to the upper part of the revolving carriage. This nozzle has the upper end thereof arranged centrally with reference to the rotary carriage and telescopically connects with a stationary spout 56 to which material to be treated is supplied to the apparatus, preferably in the form of a slurry of flakes or ground material and a solvent or miscella. The nozzle 55 is curved so that the lower end thereof will be arranged over the inner portions of the containers for the material. Preferably a diverter plate 57 is pivoted on the discharge end of the nozzle 55 and is adjustable thereon so as to direct the material into the containers to fill them to approximately uniform height.

After the material in the stationary containers has been treated by means of solvents, these extracted solids are dumped into a hopper 60 carried by the revolving frame or carriage. The lower end of this hopper is connected with a conveyor housing 61 containing a screw conveyor 62, so that material dumped into the hopper will fall into the conveyor housing. This housing extends radially and the screw 62 is rotated in a direction to discharge the extracted solids toward the center of the apparatus. The conveyor housing has a discharge spout 63 which telescopically extends into a tube 64 which terminates in another conveyor 65 arranged below the bottom 8 of the apparatus and through which the extracted solids are discharged from the apparatus in any suitable manner.

The movable carriage or frame rotates in a counter-clockwise direction and the guide tracks or cams 32 and 33 are constructed so that the bottoms 25 of the stationary containers will successively be permitted to swing downwardly on their hinges 28 into substantially upright positions when the hopper 60 of the movable carriage or frame is positioned under the container which is to be dumped. For this purpose the cam tracks 32 and 33 are interrupted or curved downwardly at 68, FIG. 3. After the extracted material has been dropped from a container into the hopper 60, the roller 30 of the container which has just been dumped moves into engagement with an upwardly inclined portion 69 of the movable frame or carriage. This part 69 swings the bottom 25 of the container back into approximately horizontal closing position to confine material to be treated within the container. The tracks 32 and 33 then support the bottom in this closed position until the carriage again reaches the position shown in FIG. 3. After the bottom of a container is in closed position, the spout 55 will then be in position to refill the container with material to be treated.

*Treatment of the material*

According to my improved method, batches of material in the various stationary containers are subjected to solvent or miscella sprayed on the material while the same is stationary and free from vibrations or jars, so that fine particles are not shaken through the strainers or sieves through which the miscella passes. Any suitable means may be provided for supplying treating liquid on the material in the containers and in the apparatus shown, by way of example the miscella or solvent is sprayed on the material through a series of spray pipes 70 having discharge nozzles 71 arranged above the baskets or containers, and the liquid after being passed through the material in the baskets or containers drops through the foraminous bottoms 25 into a series of collecting pans 73, 74, 75, 76 and 77 mounted on the revolving frame or carriage. Each of these pans has a drain pipe or conduit 78.

It is of course desired to treat the material in a manner similar to that heretofore employed by means of a counterflow principle whereby the material which has just been deposited in its baskets or containers is treated with miscella which has already acted on other batches of material and which contains a relatively large quantity of extracted material, and then step by step to treat the material with miscella containing less dissolved material and finally treating the material just before its discharge from the apparatus with clear solvent. In order to accomplish this result the material from the collecting pans is delivered to a stationary collecting receptacle 80 divided into a plurality of sections, 80a, 80b, 80c and 80d, each of which constitutes a separate receptacle. This stationary receptacle may for example be divided into four sections by the radial walls 79 and is mounted on the bottom 8 of the apparatus, and in order to make it possible for miscella from different collecting pans on the movable carriage to be conducted to the desired parts of the stationary collecting receptacle 80, a series of annular collecting troughs or rings 81, 82, 83 and 84 is provided which are arranged on top of the collecting receptacle 80. Each collecting trough or ring is connected with one of the compartments of the collecting receptacle 80. For example, as shown in FIGS. 1 and 4, the collecting ring 81 has an opening in the bottom thereof above one of the compartments or divisions of the receptacle 80 and the collecting ring 84 has an opening leading to another compartment of the receptacle 80. The drain pipes or conduits 78 which rotate with the carriage terminate immediately above their stationary annular collecting troughs so that the liquid which has passed through baskets containing material in different stages of extraction may be collected in different sections of the receptacle 80 and passed to other baskets. If desired, two or more pipes 78 may discharge into a single, annular trough.

The apparatus is provided with four pumps 86, FIG. 4, which may be located below the apparatus, each of which receives liquid from a different section of the receptacle 80 or directly from one of the troughs through pipes 87 and pass the liquid through three stationary pipes 88, FIG. 1 to three of four annular ring-shaped troughs 89, each of which connects with a discharge pipe 70 leading to a spray nozzle 71. The fourth or outer trough 89 receives fresh solvent through a tube 88a.

The various collector rings or troughs, the compartments of the receptacle 80, the discharge pipes 88 and the troughs 89 may be connected in any desired manner, depending upon the material which is being treated and the manner of treating the same selected by the user of the apparatus. For example, for certain materials it is desirable to treat the fresh material with miscella containing a relatively large percentage of the extracted substance. Consequently this type of miscella is sprayed to the top of the basket 11, into which material to be treated is deposited, to help level out the material fed to this basket and at the same time to begin the extraction cycle of this freshly introduced material. This miscella discharges into the collecting pan 77 below the basket 11 and from there to the collecting ring 81. This miscella contains a large percentage of the extracted material and also contains a certain amount of fines because the mixture of the material with the miscella during the filling of the basket results in washing through the screening of the bottom of the basket a considerable quantity of fine material. In order to reduce as much as possible the fines contained in the miscella, this strong miscella is then fed by one of the pumps 86 to the spray nozzle which passes over the basket 12. By this time the bed of flakes in the basket 12 has settled down so that a good filter bed has been established which will filter out much of the fine material. This strong miscella from the inner collecting trough 81 passes through the discharge hole therein into the sector 80a of the receptacle 80, see FIG. 4, and passes through one of the tubes 87 to the pump 86 which is located at the right of the group of pumps in FIG. 4. From here this strong miscella is passed through one of the pipes 88 to the innermost of the annular troughs 89, FIG. 1, which trough, as clearly shown in FIG. 2, leads through that pipe 70 and spray nozzle 71 which is located over the basket 12. This strong miscella percolating through the basket 12 leaves this basket at full strength and is collected in the pan 76 which drains through its discharge pipe 78 to the outer annular trough 84, FIG. 4, which drains into the sector 80c of the receptacle 80 from where it is pumped by the pump 86, namely one of the farthest to the left of the group of pumps, to an evaporation system.

After the rotating filling spout 55 has filled the stationary compartment 11, it will continue its counterclockwise motion and fill the compartment 10 which has just had its hinged bottom closed by the action of the track portion 69 of the cam track on the roller 30.

It is not deemed necessary to follow through the various connections leading to and from the various compartments, since the paths taken by the miscella will be similar to those described in connection with the containers or baskets 11 and 12 except of course that the various pipes 70 may lead to different annular receiving troughs above the receptacle 80. It will also be obvious that while I have shown four troughs 81, 82, 83 and 84 above the receptacle 80, as many troughs may be provided as may be deemed necessary for the particular material which is being operated upon, in which case the receptacle 80 may also be divided into a different number of sectors or, if desired, different containers may be provided for each of the annular receiving troughs. Similarly, the number of pumps may be varied as well as the troughs 89 which rotate with the carriage of the apparatus. When the movable carriage is in the position shown in the drawings, the material in the containers 13, 14, 15, 16 and 17 is being washed by successively weaker miscella and the material in the compartment 18 is being washed with solvent. The material in the containers 19 and 20 is draining.

Solvent may be introduced into the apparatus in any suitable manner. For example, solvent from a suitable supply (not shown) may be passed to the outermost trough 89 through a pipe 88a from where it passes through a spray pipe and nozzle to the compartment 18, FIG. 2.

The extracted material in the stationary compartment 21 in the positions of the parts shown in the drawing is being dumped into the movable hopper 60 and this movable hopper will then move to the receptacle 20 and dump the extracted flakes from this container or basket.

The flow of solvent and successively stronger miscella is counter-current through all the stages until the stage 11 adjacent to the filling compartment. The flow of miscella through the material in the containers 10 and 11 however is concurrent in order to filter fines from the miscella.

The drive of the rotary frame or carriage and of the screw conveyor 62 may be effected in any suitable or desired manner. For example, the shaft 52 which carries the pinion 51 meshing with the rack ring 50 may be driven from a sprocket chain 90 through a speed reducer 91. Any suitable means (not shown) may be provided for driving the sprocket chain. The conveyor 62 in the particular construction illustrated is driven from a stationary rack gear or ring 94 which in the construction shown is also secured to the annular support 48 and meshes with a pinion 95 secured on a shaft 96, see FIGS. 1 and 5. The shaft 96 has a relatively large gear 97 mounted thereon which meshes with the small gear 98 secured on a shaft 99 which in turn has a large gear 100 secured thereto which meshes with a pinion 101 on a shaft 102 on which a sprocket gear 103 is also mounted which drives a sprocket chain 104 which meshes with a sprocket mounted on the conveyor shaft. Any other means for driving the conveyor 62 may be provided if desired. This gear train may be mounted on a frame 105 secured to and depending from the hopper 60.

106 represents a drain pipe through which any liquid collecting on the bottom wall 8 may be removed from the apparatus.

The process and apparatus described have the advantages that the material which is being treated and which of course is relatively heavy, remains stationary throughout the extraction. This results in a material reduction in the power required to operate the apparatus and in the wear of parts of the same as compared with apparatus in which the material while being treated is moved from one treating station to another, in that the carrier in the apparatus described is relatively light and supports only a small portion of the material under treatment during a very short interval of time while it is dumped from a container or basket into the hopper on the carriage, from which it is quickly discharged from the apparatus. The revolving carriage or frame does not carry any substantial weight of material while it is being deposited in the baskets or containers since the nozzle 55 serves mainly to guide the material to be treated into the stationary baskets or containers. This relatively small weight of the carriage or movable frame also makes it possible to construct the apparatus at less cost and of larger size and capacity than other types of apparatus now employed for this purpose.

The process and apparatus described has the further advantage that since the material to be treated remains stationary during the entire treatment, it is not subject to vibrations or jars such as result when the material itself is being transported from one treating station to another. This results in a superior miscella which is relatively free from fines and therefore easier to handle in the evaporation system.

While this apparatus and process have been described mainly for use in connection with the extraction of oils or fats from oil bearing vegetable or animal products, yet it will be understood that the process and apparatus may also be used for the treatment of other materials. While it is preferred to have the carriage or movable frame move about a fixed axis in a circular path, yet it will be understood that the baskets or holders and the travel of the carriage may be arranged in a non-circular path.

It will be understood that various changes in the details, materials and arrangements of parts, which have been herein described and illustrated in order to explain the nature of the invention, may be made by those skilled in the art, within the principle and scope of the invention as expressed in the appended claims.

I claim:

1. A continuous solvent extracting apparatus having a stationary housing and a series of containers for the material to be treated mounted in fixed relation to said housing and arranged in a substantially circular horizontal path and each having a foraminous wall, a rotatable carriage arranged in said housing, said carriage having an upper part arranged to move above said containers and a lower part which passes below said containers, said upper part having mounted thereon a chute located at the beginning of its cycle of travel for depositing material to be treated successively into said containers one at a time, conduits on said upper part of said carriage following said chute and successively following each other for discharging successively weaker miscella on the contents of the containers, means for supplying to the final of said conduits fresh solvent liquid, collecting devices each including a collecting pan on the lower part of the carriage, the first of which is directly under the container which is being filled, the other of said collecting devices being arranged successively below other conduits, the last drainage pan extending beyond the last of said conduits to permit drainage of material, a discharge hopper on the lower carriage part following the last collecting pan at the end of said cycle, means on the hopper for effecting the discharge of the treated material from a container, and liquid elevating means mounted on said apparatus which feed liquid from said collecting means to said conduits in a manner so that the strongest miscellas are applied to the containers closest to the beginning of the cycle.

2. A continuous solvent extracting apparatus having a stationary housing and a series of stationary containers for the material to be treated mounted in fixed relation to said housing and arranged in a substantially circular horizontal path and each having a foraminous wall, a rotatable carriage arranged in said housing, said carriage having an upper part arranged to move about said containers and a lower part which passes below said containers, said upper part having mounted thereon a chute for depositing material to be treated successively into said containers one at a time, conduits on the upper part of said carriage for successively subjecting the material in said containers to treating liquid and arranged on said carriage after said chute, the lower part of said carriage having a receiving hopper which receives treated material from said containers and arranged in advance of said chute, liquid collecting devices on said lower part of said carriage arranged in advance of said hopper and which receives liquid of successively increasing concentration from said containers, liquid elevating means which feed liquid collected by said lower part of said carriage to certain of said conduits arranged on said carriage on the remainder of the circumferential area, so that successively stronger concentrations of liquid are distributed on the containers which are farthest removed from the discharge hopper, the upper part of said carriage also supporting means for discharging fresh liquid through one of said spray devices to the material in a container immediately prior to the discharge of treated material therefrom.

3. A continuous solvent extracting apparatus including a fixed housing, a series of containers for the material to be treated, said containers being rigidly mounted in stationary positions on said housing and having perforated wall portions through which liquid can drain from the material, said containers being arranged in an endless, substantially horizontal series, a carriage mounted to move in close proximity to said horizontal series and having a chute mounted thereon movable with said carriage to discharge material to be treated successively to each of said containers, a relatively stationary spout connected with one end of said chute for delivering material to be treated thereto, a hopper mounted on said carriage and to which treated material from each container is discharged in one position of said carriage before said discharge chute moves into position to deposit material thereon, a conveyor mounted on said carriage and positioned in the direction of movement of said carriage between said spray devices and said discharge chute, means for dumping treated material successively from said containers into said conveyor, means on said conveyor for removing the treated material from the apparatus, collecting pans on said carriage and movable below said containers for receiving miscella discharged therefrom, conduits for spraying miscella to the material in said containers, and means for supplying miscella from said pans to some of said conduits.

4. A continuous solvent extracting apparatus including a stationary housing, a series of stationary containers for the material to be treated fixedly mounted on said housing and arranged in a circular, substantially horizontal series and having perforate portions through which liquid may drain from said material, a carriage movable about a pivot fixed with relation to said housing and forming approximately a center to said circular series, a material discharge member mounted on said carriage for depositing material to be treated successively into each of said containers, means including a hopper mounted on said carriage below said containers for successively receiving treated material from said containers, liquid receiving means on said carriage for collecting liquid discharged from said containers, a plurality of stationary annular troughs arranged below said carriage and to which liquid drained from different containers on said carriage is selectively discharged, each trough receiving only liquid discharged from containers according to their location on said carriage, whereby each trough will contain miscella of oil content differing from that contained in other troughs, another series of annular troughs mounted on said carriage above said containers, liquid propelling devices for transferring liquid from each of said stationary troughs to a specific trough on said carriage, conduits for supplying liquid from said other series of troughs on said carriage to some of said containers for treating the material contained therein with miscella of different concentrations, and means for removing treated material from said hopper.

5. A continuous solvent extraction apparatus including a series of containers for the material to be acted upon, a stationary frame to which said containers are rigidly secured, a revolving carriage also mounted on said frame, a chute on said carriage above said containers and movable from container to container and depositing material to be acted upon successively to said containers, conduits mounted on and movable with said carriage above said containers for successively discharging treating liquid on the material in said containers, collecting pans on said carriage below said containers for collecting liquid which has passed through the material and out of said containers, means for elevating the liquid from said collecting pans to said conduits, and means on said carriage below said containers for removing treated material therefrom.

6. In a continuous solvent extracting apparatus including a series of stationary containers for the material to be treated arranged in a circular series and having a foraminous lower wall, a carriage movable about the axis of said circular series including a part arranged above the containers for admitting material to the same, and a part below said containers, said lower part of said carriage being provided with pans arranged below said containers to receive solvent discharged from the same, a series of substantially circular stationary collecting troughs arranged below said carriage, drain pipes leading from said pans to said collecting troughs, certain of said pans being connected by drain pipes to certain of said collecting troughs continuously during their movement about said axis, a second series of annular troughs mounted on said upper part of said carriage, pumps for each collecting trough and connected with and discharging the liquid therefrom to one of said upper troughs, and conduits connected with said upper troughs for discharging liquid therefrom to said containers.

7. In a continuous solvent extracting apparatus including a series of stationary containers for the material to be treated arranged in a circular series and having a foraminous lower wall, a carriage movable about the axis of said circular series including a part arranged above the containers for admitting material to the same, and a part below said containers, said lower part of said carriage being provided with pans arranged below said containers to receive solvent discharged from the same, a series of substantially circular stationary collecting troughs arranged below said carriage, drain pipes leading from said pans to said collecting troughs, certain of said pans being connected by drain pipes to certain of said collecting troughs continuously during their movement about said axis, conduits mounted on said upper part of said carriage and movable therewith for supplying liquid to said containers, and means including pumps for discharging liquid from said pans to said conduits.

8. In a continuous solvent extracting apparatus including a series of stationary containers for the material to be treated arranged in a circular series and having a foraminous lower wall, a carriage movable about the axis of said circular series including a part arranged above the containers for admitting material to the same, and a part below said containers, said lower part of said carriage being provided with pans arranged below said containers to receive solvent discharged from the same, a series of annular troughs mounted on the upper part of said carriage, conduits connected with said troughs for discharging liquid contained therein to said containers, and means including pumps for discharging liquid from said pans to said upper troughs.

9. A continuous solvent extraction apparatus including a stationary housing, a series of containers for material to be subjected to extraction, said containers being rigidly secured in fixed relation to said housing and arranged about an upright axis and each having a foraminous wall, a carriage rotatable relatively to said containers about said axis, a duct for admitting material to be treated into said containers and mounted on said carriage above said containers to move with said carriage about said axis to discharge material in succession into each of said containers, solvent discharge conduits also mounted on said rotatable carriage above said containers and movable with said carriage relatively to said containers into various positions to deliver solvent successively into different containers, collecting means for the miscella discharged from said containers through said formainous wall and arranged on said carriage below said containers, feed troughs mounted on said carriage and arranged above said containers, means for conducting miscella from said collecting means to said feed troughs for discharge to the material in said containers, and means actuated by said carriage for successively dumping the treated material from said containers.

10. A continuous solvent extracting apparatus including a stationary housing, a series of containers for the material to be treated rigidly secured to said stationary housing and arranged in a circular substantially horizontal path and each having a foraminous wall, a carriage rotatable in a circular path substantially concentric with said first mentioned circular path, a chute on said carriage for delivering material to be treated successively into said containers, conduits carried by said carriage for successively subjecting the material in said containers to treating liquids, collecting pans on said carriage which are moved by said carriage successively below said containers and into which liquid is discharged after passing through the material in said containers, a series of stationary annular troughs each receiving liquid of different concentration from certain of said pans, dumping means for removing the treated material from said containers, means mounted on said carriage for actuating said dumping means, and means for returning liquid from said annular troughs to said conduits for again treating the material in said containers with liquid which has been pased through the material in other containers.

11. A solvent extraction apparatus according to claim 10 and including a discharge tube for each pan and extending from its pan to one of said lower troughs and means for discharging liquid from the apparatus from one of said troughs.

12. A continuous solvent extraction apparatus including a stationary housing, a series of containers for material to be subjected to extraction, said containers being rigidly secured on said housing and arranged about an upright axis and each having a foraminous wall, a carriage rotatable relatively to said containers about said axis, a duct for material to be treated and mounted on said carriage above said containers to move with said carriage about said axis to discharge material in succession into each of said stationary containers, individual conduits also mounted on said rotatable carriage above said containers and movable with said carriage relatively to said containers into various positions to discharge solvent and successively stronger miscella into different containers countercurrent to the movement of the carriage, drain pans mounted on said carriage below said containers, individual stationary collecting receptacles receiving miscella from said drain pans, said drain pans being arranged in fixed relation on the carriage, upper feed troughs mounted on said carriage and arranged above said containers, a conduit system conducting miscella from said collecting receptacles to said upper feed troughs, and means actuated by said carriage at the latter part of its cycle of movement for dumping extracted material successively from the separate containers.

13. A continuous solvent extracting apparatus including a series of stationary containers for the material to be treated arranged in an endless, substantially horizontal path, and each having a foraminous wall, a carriage having parts arranged above said containers for depositing material to be treated successively into each of said containers and movable in close proximity to said path, a series of conduits mounted on said carriage above said containers for discharging treating liquid on the material in said containers, a plurality of troughs mounted on said carriage above said containers and movable with said carriage, certain of said troughs being connected with certain of said conduits for selectively discharging liquid to the material in certain of said containers, pans mounted on said carriage for movement below said containers for collecting miscella discharged therefrom, means for returning the miscella from said pans to certain of said troughs for distribution to the material in said containers, means for discharging treated material from said apparatus, means for imparting motion to said carriage in said path, and means for delivering fresh solvent to one of said troughs for application on material previously treated with miscella.

14. A continuous solvent extracting apparatus including a series of stationary containers for the material to be treated arranged in an endless, substantially horizontal series, a carriage having parts arranged above said containers for depositing material to be treated successively into each of said containers and movable in close proximity to said path, a series of troughs arranged on the upper portion of said carriage, conduits connected with said troughs for discharging liquid from said troughs to the material in some of said containers, collecting pans on said carriage movable successively under containers on which liquid is being discharged, a series of stationary troughs arranged below said carriage, each trough being arranged to receive liquid collected in at least one of said collecting pans, elevating means for raising liquid from said last mentioned troughs into said first mentioned troughs for again discharging to material contained in some of said containers, means for dumping from said containers the material which has been treated, and means for removing from the apparatus miscella which has made several passages through said containers.

15. Apparatus according to claim 14 and including means for introducing fresh solvent to one of said troughs mounted on said carriage, and a conduit mounted on said carriage and connected with said last mentioned trough for discharging fresh solvent on material in a container, which material has been repeatedly subjected to treatment by miscella.

References Cited in the file of this patent

UNITED STATES PATENTS

| | | |
|---|---|---|
| 570,861 | Armstrong | Nov. 3, 1896 |
| 1,100,649 | Bennett et al. | June 16, 1914 |
| 1,294,531 | Pennington | Feb. 18, 1919 |
| 2,227,605 | Swallen et al. | Jan. 7, 1941 |
| 2,682,551 | Miller | June 29, 1954 |
| 2,686,192 | Bonotto | Aug. 10, 1954 |
| 2,703,274 | Giesse et al. | Mar. 1, 1955 |
| 2,840,459 | Karnofsky | June 24, 1958 |